April 3, 1934.  J. P. ARNER  1,953,285

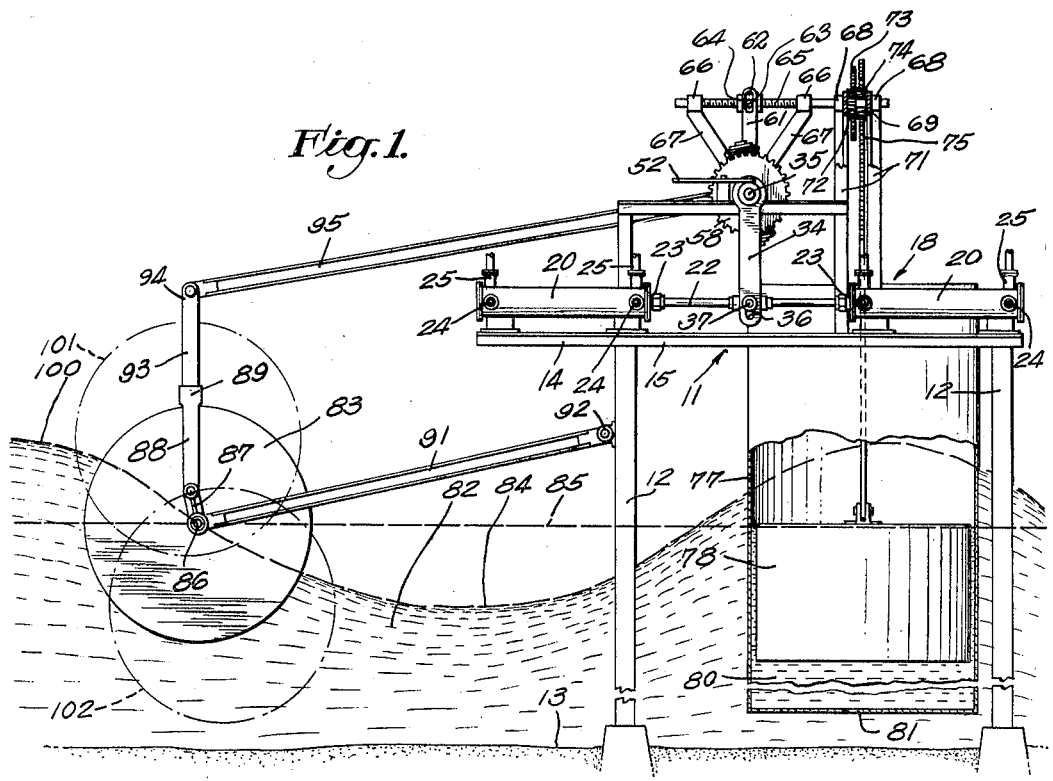

WAVE MOTOR

Filed Jan. 30, 1933  2 Sheets-Sheet 2

INVENTOR:
JERRY P. ARNER,
By Farl W. Lawin
ATTORNEY.

Patented Apr. 3, 1934

1,953,285

UNITED STATES PATENT OFFICE 1,953,285

WAVE MOTOR

Jerry P. Arner, Long Beach, Calif.

Application January 30, 1933, Serial No. 654,174

12 Claims. (Cl. 253—10)

My invention relates to a simple form of wave motor having an automatic adjustment means to keep the moving parts thereof in proper positions of operation during the change of tide from maximum to minimum.

It is an object of my invention to provide a wave motor including a stationary supporting structure to which a water engaging member is movably secured. On the supporting structure a power transforming means is mounted which is actuated by power derived from the movement of the water engaging member which is preferably in the form of a float. In the normal operation of the device the float member is raised and lowered in accordance with the passing of the peaks and valleys of the waves. In other words, the float will move above and below a center line. But, as the tide changes, this center line of movement of the float member is accordingly raised and lowered.

An object of my invention and a principal feature thereof is to provide an automatic adjusting means controlled by the mean tide or effective level of the body of water for keeping the cooperating parts of the device in proper relative positions of operation.

In the preferred embodiment of my invention I employ a power transforming device having a reciprocating part which receives power for its reciprocation from the vertical movement of the float member. The invention provides an automatic adjusting means which maintains a centralized reciprocation of the reciprocating part of the power transforming means despite the change in the position of operation of the float member.

It is an object of the invention to provide an automatic adjustment means for a wave motor, comprising a float chamber extending down into the body of water, and a float therein adapted to float on the water within the float chamber and being connected with adjusting means for changing the relative positions of the operating parts of the wave motor as the tide level or effective water level changes within the float chamber.

It is a further object of the invention to provide a simple form of mechanical movement for transmitting the movement of the float member to the power transforming means, including a pair of members having gear teeth formed therein and being spaced apart, one of such members being relatively stationary and the other of the members being movable. Between these members a gear member is placed so as to roll in engagement with the teeth of the relatively stationary member, thereby causing movement of the movable member. Means are provided for moving the gear back and forth in accordance with movement of the float member, and means are provided for an adjusting movement of the relatively stationary member upon which the gear rolls during its operation.

Further objects and advantages of the invention will be made evident throughout the following part of the specification.

Referring to the drawings, which are for illustrative purposes only,

Fig. 1 is a schematic elevational view showing an embodiment of my invention with the working float thereof in one position of operation.

Fig. 2 is an elevational view similar to Fig. 1 showing the working float of the device in another position of operation as occasioned by the change in tide or effective level of the body of water in which the wave motor is in operation.

Fig. 3 is an end view of the device shown in Figs. 1 and 2, with the working float in raised position.

Fig. 4 is an enlarged fragmentary, partly sectioned view taken as indicated by the line 4—4 of Fig. 2.

In the practice of my invention I employ a supporting structure which may be constructed in accordance with the various designs of marine structures. For the purpose of illustration I employ a supporting structure 11 of the wharf type, including piles or leg members 12 which extend upwardly from an ocean floor 13 and having a flooring or superstructure 14 secured to the upper ends thereof. The superstructure 14 includes side members 15 and 16 and cross members such as shown at 17 in Fig. 3.

Above the side member 15 a power transforming means 18 is mounted and is shown as consisting of a pair of double-acting pumps 20, axially aligned and having a common piston rod 22 extending through stuffing boxes 23 at the facing ends thereof. These pumps 20 are of the cylinder-piston type, and at the ends thereof have inlet and outlet valves 24 and 25 which may be respectively connected to fluid supply and fluid pressure reservoirs so that when the piston rod 22 is reciprocated, fluid will be pumped. As diagrammatically shown in Fig. 3, the inlet valves 24 may be connected through piping 26 with a fluid reservoir 27 which may contain water or oil adapted to be pumped by the operation of the pumps 20 through piping 28 to a receiver or pressure reservoir 30 which is in turn connected through piping 31 with a turbine or motor generator set 32, the discharge fluid therefrom being conducted through piping 33 to the reservoir 27. By use of equipment of this character, the power represented in the reciprocating motion of the piston rod 22 may be transformed to fluid motion, and a further transformation may be accomplished by conducting the fluid through a turbine or turbine generator set, such as diagrammatically illustrated at 32, whereby electrical energy may be obtained.

The power transforming means 18 includes a reciprocating part in the form of a lever 34 which extends downwardly from a shaft 35 and has a slot 36 in its lower end adapted to engage a trunnion 37 carried by the rod 22. As best shown in Figs. 3 and 4, the shaft 35 is preferably horizontally disposed and is carried by bearings 38, 40, and 41, supported respectively by members 42, 43, and 44 which extend upwardly from the superstructure 14. The reciprocating part 34, in the form of a lever, is turnably mounted on the end 45 of the shaft 35 but is adapted to be reciprocated with the shaft, when such shaft is given a reciprocatory rotation, by use of a simple jaw clutch member 47 which is splined to the end 45 of the shaft 35 and is slidable into and out of engagemnt with jaw members or lugs 48 formed on the hub 50 of the lever 34. The member 47 is shown with a projection 51 adapted to be engaged by a horizontally swingable shifting lever 52. Between the bearing members 40 and 41 a block 53 is turnably mounted on the shaft 35. This block 53 has a pair of extending trunnions 54 on which intermediate gear members 55 are mounted in positions to engage a relatively stationary fulcrum or reaction gear 57 and a driven gear member 58. The gears 55, 57, and 58 are of the bevel gear type, and the gears 57 and 58 are placed on opposite sides of the block 55, the gear 58 being keyed to the shaft 35 as indicated at 60. The gear 57 is not secured to the shaft 35, but the shaft 35 turns therein, the gear 57 being held stationary by an extending lever 61 having a slot 62 in its upper end adapted to engage a pin 63 projecting from a nut 64 threaded on a horizontal screw 65. By rotating the screw 65, the nut 64 may be caused to move, and the lever 61 may be swung to either side of the centralized position in which it is shown in Fig. 1. It will be perceived that by rotating the block 53 on the shaft 35 the gears 55 will be caused to roll upon the stationary fulcrum gear 57 and will cause the gear 58 to rotate, thereby turning the shaft 35 through an angle twice the angle through which the block 53 is carried, and accordingly swinging the lever 34 so as to move the piston rod 22 of the power transforming means 18.

The screw 65 is mounted in bearings 66 carried at the upper ends of arms 67 which extend from the bearing member 41 of Fig. 4. As shown in Figs. 1 and 2, the rightward end of the screw 65 extends through bearing members 68 carried by horizontal bars 69 supported at the upper end of upright members 71. Between the bearing members 68 a pinion 72 is secured to the screw 65 in a position to be engaged by a gear 73 which is also mounted between the members 68, and which has a small gear 74 secured to the face thereof. The small gear 74 is engaged by a vertical rack 75 which projects downwardly within a cylindrical float chamber 77, to an adjusting float 78 which floats in the body of water 80 which has entered the float chamber 77 through an opening 81 in the bottom thereof. As the level of th body of water 80 changes, the float 78 will be raised or lowered, and through the rack 75 and the gears 73 and 74, a motion will be transmitted to the pinion 72 whereby to rotate the screw 65 and thereby change the position of the nut 64 and the lever 61 in accordance with the change in the level of the body of water 80 which represents the mean tide level or effective level of the body of water 82 on which a float 83 is in flotation. The upper surface 84 of the body of water 82 undulates with a wave motion, the peaks and valleys of the undulations being respectively above and below the mean tide level or effective level 85 of the body of water 82.

As shown in Fig. 3, the float member 83, which is of cylindrical or drum form, has axial trunnions 86 engaged by bearing members 87 which are secured to the legs 88 of a yoke 89 which extends over the upper portion of the float 83. Vertically swingable arms 91 extend rearwardly, or rightwardly, from the bearing members 87 to hinge members 92 mounted on the uprights or piles 12 of the supporting structure 11. A pair of bars 93 extend upwardly from the center of the yoke 89 and carry pivot means 94 at the upper ends thereof to which a lever 95 pivotally connects, this lever being secured to the block 53 so that as the float 83 vertically reciprocates due to the wave motion, the lever 95 will be swung vertically and will impart a rotary reciprocation to the block 53.

In Fig. 1 the effective water level 85 is shown at an intermediate position. The waves 100, rising and falling above and below this mean level 85, raise and lower the drum or float 83 to the positions indicated by dotted lines 101 and 102, the movement of the float 83 being centralized relative to the line 85. It is intended that the motion of the float between the positions 101 and 102 will swing the reciprocating part or lever 34 of the power transforming means 18 equal distances on opposite sides of the vertical position shown in full lines in Fig. 1 when the float 83 is in its intermediate position, as shown also in full lines in Fig. 1.

Reciprocation of the lever 95 turns the block 53 through an angle, and the intermediate gear members 55 are caused to roll in engagement with the teeth of the reaction gear member 57 which is held stationary. Accordingly, the gear 58 will be driven, and the shaft 35 will be thereby rotated in a manner to reciprocate the lever 34.

The invention provides means for automatically adjusting the driving mechanism which includes the gears 55, 57, and 58, so that the lever 34 will have a centralized swinging movement or, in other words, will swing equal distances on opposite sides of the central position in which it is shown in Fig. 1. This is accomplished by turning the reaction or fulcrum gear 57 as the tide or effective level 85 changes. Accordingly, should the level 85 be raised to a level 85', as shown in Fig. 2, the level of water 80 within the float chamber 77 will rise accordingly, thereby moving the float upwardly, with the result of raising the rack 75 and through the gears 74, 73, and 72 turning the screw 65 in such direction that the lever 61 will be swung to the right, as shown in Fig. 2, thereby changing the position of the reaction gear 57 to correspond to the new working position of the float 83 occasioned by the change in the effective level of the body of water 82. It will be seen that the adjustment of the gear 57 automatically in accordance with the change of the effective level 85 will maintain the gears 57 and 58 in such relation that the lever 34 will have a centralized rotary reciprocation at all times. The double-acting pumps 20 will be accordingly operated to transform the energy derived from the reciprocation of the float 83. It will be seen that the device 18 may be employed merely for the purpose of pumping water or for the purpose of generating power as described relative to Fig. 3.

The levers 34 and 95 comprise a linkage means for transmitting the movement of the float 83 to the pin 37 of the power transforming means 18. It will be seen that as the adjusting float 78 rises and lowers, this linkage is shortened and lengthened; that is, the distance between the opening 36 of the lever 34 and the pivot means 94 at the leftward end of the arm 95 changes, as will be clearly seen from Figs. 1 and 2, thereby changing the working plane of the float 83, or, in other words, keeping a centralized operation of the lever 34 as the working position of the float 83 changes with the rise and fall of the tide.

The float 83 is adapted to rotate on a horizontal axis as the water passes thereunder, thereby minimizing lateral thrusts which are transmitted through the lever arms 91 to the supporting structure 11. The float 83 is provided with a plug 106 which may be removed from an opening in the float 83 to permit placing of fluid, such as water, within the float to serve as a weight or ballast sufficient to overcome the resistance of the power transforming means 18 to the downward movement of the float 83 and the members 91 and 95 secured thereto.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a wave motor, the combination of: a stationary supporting member disposed over a body of water from which power is to be derived; a working member pivotally secured to said supporting member and adapted to be moved by the water in a plurality of working positions relative to said stationary supporting member; power transforming means adapted to be drivably connected to said working member; a float chamber extending down into said body of water, said float chamber having an opening near the lower end thereof for permitting water to flow into and out of said chamber; an adjusting float in said float chamber; and linkage means connecting said power transforming means to said working member, said linkage means being controlled by said adjusting float so that its effective length will increase and shorten in accordance with the fall and rise of said adjusting float, whereby to change the working position of said working member in accordance with the change in the effective level of said body of water.

2. In a wave motor, the combination of: a supporting structure disposed over a body of water; a working float movably connected to said supporting structure so as to float on said water and being adapted for reciprocating movement by wave motion; power transforming means on said supporting structure, having a reciprocable part for receiving motion; a driven gear member connected to said reciprocable part; a reaction gear member spaced from said driven gear member; an intermediate gear member connecting said reaction gear member with said driven gear member and being adapted to roll on said reaction gear member whereby to move said driven gear member; means connecting said working float to said intermediate gear member so that movement of said working float will cause operative movement of said intermediate gear member; an adjusting float movably carried by said supporting structure; and means connecting said adjusting float to said reaction gear member so that movement of said adjusting float will turn said reaction gear member in accordance with the change of the position of said adjusting float.

3. In a wave motor, the combination of: a supporting structure disposed over a body of water; a working float movably connected to said supporting structure so as to float on said water and being adapted for reciprocating movement by wave motion; power transforming means on said supporting structure, having a reciprocable part for receiving motion; a driven gear member connected to said reciprocable part; a reaction gear member spaced from said driven gear member; an intermediate gear member connecting said reaction gear member with said driven gear member and being adapted to roll on said reaction gear member whereby to move said driven gear member; means connecting said working float to said intermediate gear member so that movement of said working float will cause operative movement of said intermediate gear member; an adjusting float movably carried by said supporting structure; walls forming a float chamber around said adjusting float, there being an opening in the lower part of said float chamber; a screw member; means using the movement of said adjusting float member to rotate said screw member; and means utilizing the screw member to rotate said reaction gear member in accordance with the movement of said adjusting float whereby to compensate for the change in the working position of said working float and thereby maintain a centralized movement of said reciprocable part.

4. In a wave motor, the combination of: a supporting structure disposed over a body of water; a working float movably connected to said supporting structure so as to float on said water and being adapted for reciprocating movement by wave motion; power transforming means on said supporting structure, having a reciprocable part for receiving motion; a driven gear member connected to said reciprocable part; a reaction gear member spaced from said driven gear member; an intermediate gear member connecting said reaction gear member with said driven gear member and being adapted to roll on said reaction gear member whereby to move said driven gear member; means connecting said working float to said intermediate gear member so that movement of said working float will cause operative movement of said intermediate gear member; an adjusting float movably carried by said supporting structure; walls forming a float chamber around said adjusting float, said float chamber having an opening near the lower part thereof; a screw member rotated in accordance with the raising and lowering of said adjusting float; a nut on said screw member adapted to move in accordance with the rotation of said screw member; and means connecting said nut with said reaction gear member so as to rotate said reaction gear member in accordance with the change in the effective level of said body of water and thereby compensate for the change in the working position of said working float as said effective level of said body of water changes.

5. In a wave motor, the combination of: a supporting structure disposed over a body of water; a working float movably connected to said supporting structure so as to float on said water and being adapted for reciprocating movement by wave motion; power transforming means on said supporting structure, having a reciprocable part for receiving motion; adjustable linkage means connecting said working float with said reciprocable part of said power transforming means whereby reciprocation of said working float will accomplish reciprocation of said reciprocable part; an adjusting float movably carried by said supporting structure so as to float on said water; and means controlled by said adjusting float for varying the length of said linkage means so as to centralize the movement of said reciprocable part as the change in tide varies the zone of movement of said working float.

6. In a wave motor, the combination of: a supporting member disposed over a body of water from which power is to be derived; a working member pivotally secured to said supporting member and engaging said body of water so as to be moved thereby in a plurality of working positions; a power transforming means; an adjustable linkage connecting said working member to said power transforming means; and means for automatically varying the effective length of said linkage so as to raise and lower the working position of said working member in accordance with the change of the effective level of said body of water.

7. In a wave motor, the combination of: a supporting member disposed over a body of water from which power is to be derived; a working member pivotally secured to said supporting member and engaging said body of water so as to be moved thereby in a plurality of working positions; a power transforming means; an adjustable linkage connecting said working member to said power transforming means; and adjusting float means floating in said body of water and connected to said linkage so as to automatically vary the effective length of said linkage so as to raise and lower the working position of said working member in accordance with the change of the effective level of said body of water.

8. In a wave motor, the combination of: a stationary supporting structure disposed over a body of water; a working float; a lever member pivotally connecting said working float to said supporting structure in a position to float on said water and be vertically reciprocated by wave motion; power transforming means carried on said supporting structure, having a reciprocable part for receiving motion; adjustable movement transmitting means connecting said working float with said reciprocable part of said power transforming means whereby reciprocation of said working float will accomplish reciprocation of said reciprocable part; an adjusting float movable relative to said supporting structure so as to float on said water; and an adjusting connection between said adjusting float and said movement transmitting means for automatically adjusting said movement transmitting means to centralize the movement of said reciprocable part as the change in tide varies the zone of movement of said working float.

9. In a wave motor, the combination of: a supporting structure disposed over a body of water; a working float; a lever member pivotally connecting said working float to said supporting structure in a position to float on said water and be vertically reciprocated by wave motion; power transforming means on said supporting structure, having a reciprocable part for receiving motion; adjustable linkage means connecting said working float with said reciprocable part of said power transforming means whereby reciprocation of said working float will accomplish reciprocation of said reciprocable part; an adjusting float movably carried by said supporting structure so as to float on said water; and means controlled by said adjusting float for varying the length of said linkage means so as to centralize the movement of said reciprocable part as the change in tide varies the zone of movement of said working float.

10. In a wave motor, the combination of: a stationary supporting structure disposed over a body of water, said supporting structure comprising a pivot; a working float swingably connected to said pivot so as to float on said water and being adapted for reciprocating movement by wave motion; power transforming means carried on said supporting structure, having a reciprocable part for receiving motion; adjustable movement transmitting means connecting said working float with said reciprocable part of said power transforming means whereby reciprocation of said working float will accomplish reciprocation of said reciprocable part; an adjusting float movable relative to said supporting structure so as to float on said water; and an adjusting connection between said adjusting float and said movement transmitting means for automatically adjusting said movement transmitting means to centralize the movement of said reciprocable part as the change in tide varies the zone of movement of said working float.

11. In a wave motor, the combination of: a stationary supporting structure disposed over a body of water, said supporting structure comprising a pivot; a working float swingably connected to said pivot so as to float on said water and being adapted for reciprocating movement by wave motion; power transforming means carried on said supporting structure, having a reciprocable part for receiving motion; adjustable movement transmitting means connecting said working float with said reciprocable part of said power transforming means whereby reciprocation of said working float will accomplish reciprocation of said reciprocable part; a float chamber extending into said water, having a restricted opening near the lower part thereof through which water may flow; an adjusting float movable relative to said supporting structure and floating in the water in said float chamber; and an adjusting connection between said adjusting float and said movement transmitting means for automatically adjusting said movement transmitting means to centralize the movement of said reciprocable part as the change in tide varies the zone of movement of said working float.

12. A wave motor of the character described, including: a stationary supporting member disposed over a body of water, said supporting member having a pivot thereon; a working member swingably connected to said pivot and adapted to be moved by said water; power transforming means drivably connected to said working member; and float means for automatically raising and lowering the working position of said working member in accordance with the change of the effective level of said body of water.

JERRY P. ARNER.